United States Patent [19]

Minami

[11] Patent Number: 5,561,848

[45] Date of Patent: Oct. 1, 1996

[54] TWO WAY PAGING SYSTEM WITH ANSWER-BACK FUNCTION

[75] Inventor: Yoichiro Minami, Tokyo, Japan

[73] Assignee: NEC Corporation, Tokyo, Japan

[21] Appl. No.: 384,450

[22] Filed: Feb. 3, 1995

Related U.S. Application Data

[63] Continuation of Ser. No. 840,538, Feb. 25, 1992, abandoned.

[30] Foreign Application Priority Data

Feb. 25, 1991 [JP] Japan ..................... 3-050249

[51] Int. Cl.⁶ .................................. H04B 7/08
[52] U.S. Cl. ................ 455/38.1; 455/84; 340/825.44
[58] Field of Search ................ 455/38.1, 38.2, 455/32.1, 82, 83, 86, 88, 89, 87; 340/311.1, 313, 825.44

[56] References Cited

U.S. PATENT DOCUMENTS

| | | | |
|---|---|---|---|
| 4,430,756 | 2/1984 | Dolman et al. | 455/87 |
| 4,542,531 | 9/1985 | Fukumura | 455/86 |
| 4,758,834 | 7/1988 | Sato et al. | |
| 4,882,579 | 11/1989 | Siwiak | 340/825.44 |
| 4,951,044 | 8/1990 | Nelson et al. | 30/825.44 |

FOREIGN PATENT DOCUMENTS

| | | | |
|---|---|---|---|
| 305775 | 3/1989 | European Pat. Off. | 340/311.1 |
| 228735 | 10/1986 | Japan . | |
| 2144565 | 3/1985 | United Kingdom . | |
| 2182470 | 5/1987 | United Kingdom . | |

OTHER PUBLICATIONS

Vance et al., IEE Proceedings F. Communications, Radar and Signal Processing, vol. 129, No. 1. Feb. 1982, pp. 2–6.

*Primary Examiner*—Reinhard J. Eisenzopf
*Assistant Examiner*—Thanh Le
*Attorney, Agent, or Firm*—Foley & Lardner

[57] ABSTRACT

After bit synchronization and frame synchronization are established in accordance with a transmission signal from a transmission office, reception RX is stopped until a reception timing assigned to a group of a portable radio unit comes. A receiving operation is performed again at the reception timing assigned to the group of the unit. If the ID code of the received signal coincides with the ID of the unit, an informing operation is performed. At the same time, transmission TX is performed. A transmitting operation is performed during a transmission signal stop period TXOF upon completion of transmission of data corresponding to all the eight groups. The transmission timing of the portable radio unit is based on the fact that frame synchronization is established in the reception RX, so that transmission TX is performed at a timing assigned to the group of the unit in the reception RX. The above-described timings prevent the transmission office and the portable radio unit from performing simultaneous transmission.

4 Claims, 7 Drawing Sheets

TWO WAY PAGING SYSTEM WITH ANSWER-BACK FUNCTION

This application is a continuation of application Ser. No. 07/840,538, filed Feb. 25, 1992 now abandoned.

BACKGROUND OF THE INVENTION

The present invention relates to a two-way paging system with an answer-back function and, more particularly, to a two-way paging system using an orthogonal detection/reception scheme.

With recent advances in data communication techniques and compact circuit techniques, a two-way paging system has been developed as a private branch communication system, which can transmit an incoming call answer-back signal, a message, and the like from a paging receiver side.

A two-way paging receiver used for a private branch paging service inevitably has a low-power transmission circuit. For services in a narrow area, e.g., a private branch paging service, the paging receiver is only required to perform short-distance transmission. Therefore, the realization of such a two-way paging system is relatively easy.

In some two-way paging systems, the transmission and reception frequencies are set to be equal to each other in consideration of the effective use of waves. In such a case, contention between reception and transmission is avoided by transmitting answer-back signals for acknowledging reception at predetermined time intervals.

In some other paging receivers, the orthogonal detection/reception scheme requiring no RF and IF filters has recently been used to achieve a reduction in size. In the orthogonal detection/reception scheme, the line frequency and the local oscillation frequency are set to be equal to each other, and beats of the reception frequency and the local oscillation frequency are extracted by a mixer. The beats are input to a low-pass filter to obtain only a baseband signal. The baseband signal is amplitude-limited by a limiter circuit. In addition, the resultant signal is demodulated to obtain an demodulated signal.

In the orthogonal detection scheme, since the local oscillation frequency and the line frequency coincide with each other, the IF becomes zero and no image frequency is present. Therefore, a harmonic amplifier and an IF amplifier do not require any high-selectivity filters for attenuating the image frequency. In addition, since the IF is zero, a channel filter for attenuating adjacent channel interfering waves can be constituted by a low-frequency active filter and can be formed on an integrated circuit.

As a conventional two-way paging system of this type, a system disclosed in Japanese Patent Laid-Open No. 61-228735 is known.

In the above-described conventional two-way paging system, since an answer-back operation must be performed without using radio frequencies, a great change in an existing transmission system is inevitably required, resulting in difficulty in constructing a system.

Furthermore, since a portable radio unit in the conventional two-way paging system requires a transmission circuit as well as a reception circuit, the size of the radio unit is much larger than that of a normal paging receiver. This poses a serious problem in portable radio units which are required to be reduced in size and weight.

SUMMARY OF THE INVENTION

It is an object of the present invention to provide a two-way paging system which can perform an answer-back operation by radio.

It is another object of the present invention to provide a two-way paging system which allows easy construction of the system without greatly changing an existing transmission system.

It is still another object of the present invention to provide a compact, lightweight two-way paging system.

In order to achieve the above objects, according to the present invention, there is provided a two-way paging system comprising a radio transmission office for transmitting a call signal in accordance with a predetermined transmission format, and receiving an answer-back signal transmitted in accordance with a predetermined transmission format, and a portable radio unit for receiving a call signal from the radio transmission office, and transmitting an answer-back signal in accordance with the predetermined transmission format when an ID signal contained in the received call signal coincides with an ID code of the unit, wherein the transmission format of the call signal in the radio transmission office is constituted by a frame sync signal transmission period during which a frame sync signal is transmitted, a data signal transmission period during which a data signal containing an ID signal is transmitted after the frame sync signal, and a transmission stop period which is equal to the data signal transmission period in duration, and during which transmission of data is stopped, and the transmission format of the answer-back signal in the portable radio unit is constituted by a frame sync signal reception period during which the frame sync signal is received during the frame sync signal transmission period, and frame synchronization is established, a data signal reception period during which the data signal transmitted during the data signal transmission period is received, and an answer-back signal transmission period which is equal to the data signal reception period, and during which the answer-back signal is transmitted in correspondence with the transmission stop period when an ID code contained in the data signal coincides with the ID code of the unit.

DESCRIPTION OF THE PREFERRED EMBODIMENTS

Embodiments of the present invention will be described below with reference to the accompanying drawings.

Figure 4:
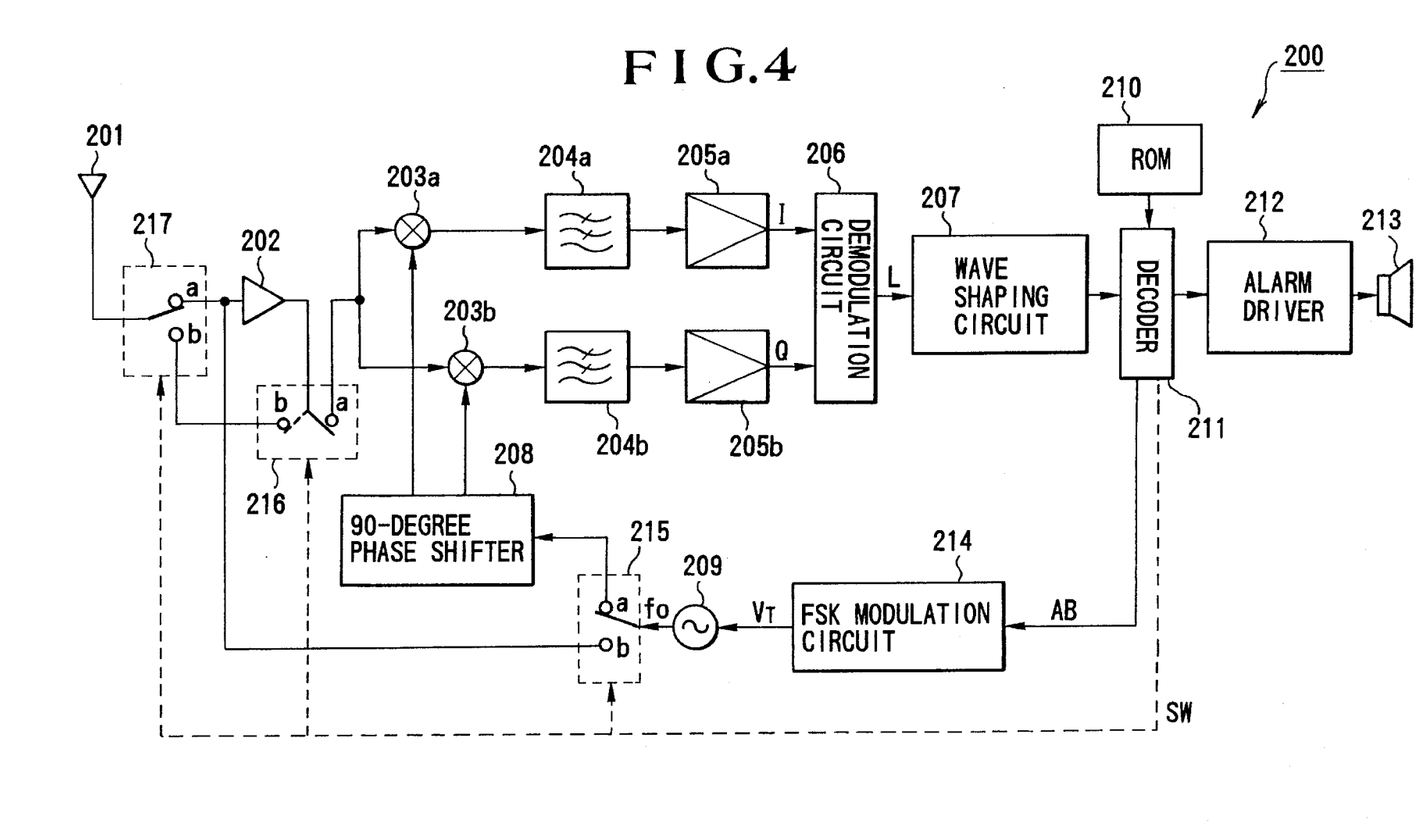
FIG. 4 is a block diagram showing a reception office in the two-way paging system of the embodiment.

FIG. 4 shows a reception office in a two-way paging system according to an embodiment of the present invention. A portable radio unit as a reception office denoted by reference numeral 200 as a whole in FIG. 4 comprises an antenna 201, an RF amplifier 202, mixer circuits 203a and 203b, low-pass filters 204a and 204b, limiter circuits 205a and 205b, a demodulation circuit 206, a waveshaping circuit 207, a 90-degree phase shifter 208, a local oscillation circuit 209, a ROM (Read Only Memory) 210, a decoder 211, an alarm driver 212, a speaker 213, an FSK (Frequency Shift Keying) modulation circuit 214, and switches 215 to 217.

This portable radio unit performs detection according to the orthogonal detection/reception scheme.

The switch 217 of the portable radio unit connects the antenna 201 to a contact (terminal) e or b in response to an output signal SW from the decoder 211. The contact a of the switch 217 is connected to the input terminal of the RF amplifier 202 and to a contact b of the switch 215. In addition, the contact b of the switch 217 is connected to a contact b of the switch 216.

The RF amplifier 202 performs RF amplification of an output signal from the switch 215 or 217.

The switch 216 connects the output terminal of the RF amplifier 202 to a contact a or b in response to the output signal SW from the decoder 211. The contact a of the switch 216 is connected to the mixer circuits 203a and 203b. In addition, the contact b of the switch 216 is connected to the contact b of the switch 217.

The mixer circuit 203a generates beats by mixing an output signal, supplied from the RF amplifier 202 through the contact a of the switch 216, with an output signal from the 90-degree phase shifter 208, and supplies the beats to the low-pass filter 204a. The mixer circuit 203b generates beats by mixing an output signal, supplied from the RF amplifier 202 through the contact a of the switch 216, with an output signal from the 90-degree phase shifter 208, and supplies the beats to the low-pass filter 204b.

The low-pass filter 204a extracts a baseband signal from the beats supplied from the mixer circuit 203a, and supplies the baseband signal to the limiter circuit 205a. At the same time, the low-pass filter 204a performs a band limiting operation on noise. The low-pass filter 204b extracts a baseband signal from the beats supplied from the mixer circuit 203b, and supplies the baseband signal to the limiter circuit 205b. At the same time, the low-pass filter 204b performs a band limiting operation on noise.

The limiter circuit 205a generates a binary signal I from the baseband signal supplied from the low-pass filter 204a, and supplies the signal I to the demodulation circuit 206. The limiter circuit 205b generates a binary signal Q from the baseband signal supplied from the low-pass filter 204b, and supplies the signal Q to the demodulation circuit 206.

Figure 7:
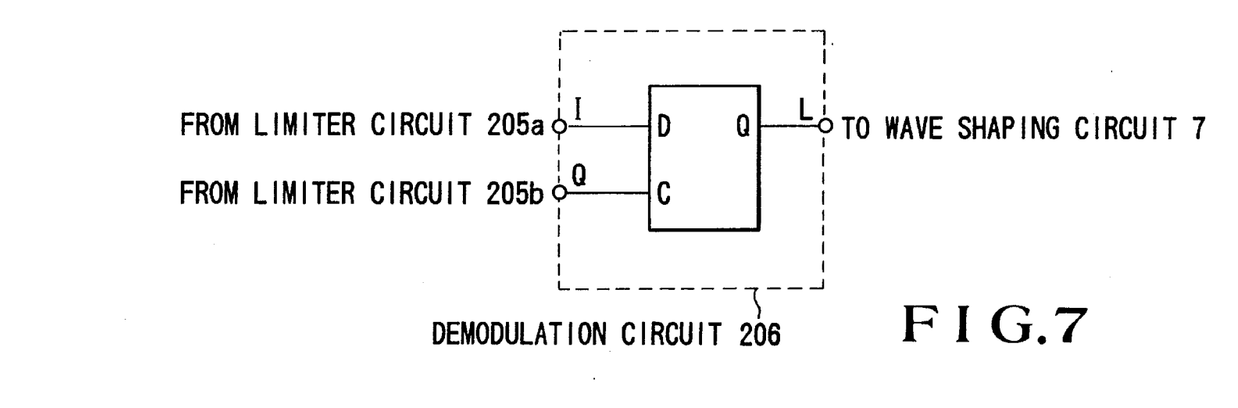
FIG. 7 is a block diagram showing a demodulation circuit in FIG. 4.

The demodulation circuit 206 is constituted by a D-flip-flop, as shown in FIG. 7. The signal I from the limiter circuit 205a is supplied to a terminal D of the D-flip-flop, while the signal Q from the limiter circuit 205b is supplied to a terminal C of the D-flip-flop. The demodulation circuit 206 generates an demodulated signal L on the basis of these two signals I and Q, and supplies the demodulated signal L to the waveshaping circuit 207.

The waveshaping circuit 207 removes noise from the demodulation circuit L supplied from the demodulation circuit 206 and supplies the obtained signal to the decoder 211.

The ROM 210 stores a selective calling number in advance.

The decoder 211 compares the demodulated signal L from the waveshaping circuit 207 with the selective calling number stored in the ROM 210. If the two signals coincide with each other, the decoder 211 supplies an alarm signal to the alarm driver 212 to inform reception of an incoming call. At the same time, the decoder 211 supplies an answer-back signal AB, associated with acknowledgement of reception of the incoming call, to the FSK modulation circuit 214, and supplies the signal SW, associated with a switching operation, to the switches 215 to 217.

Figure 5:
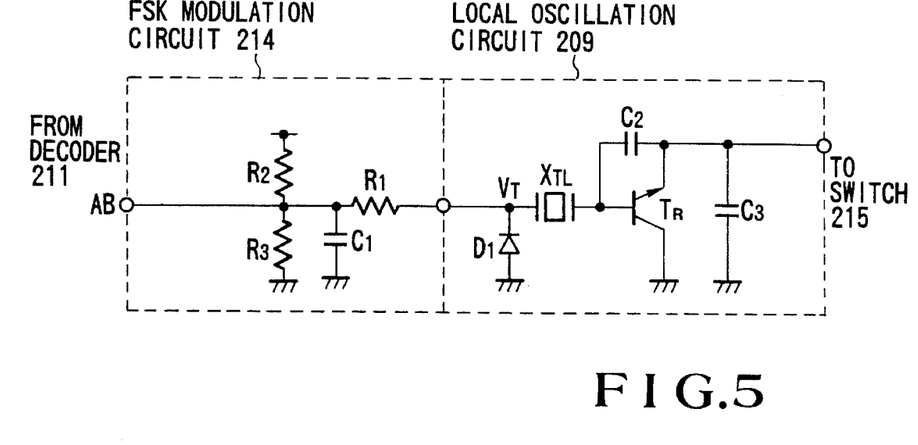
FIG. 5 is a circuit diagram showing an FSK modulation circuit in FIG. 4.

The FSK modulation circuit 214 generates a control voltage $V_T$ on the basis of the answer-back signal from the decoder 211, and applies the control voltage $V_T$ to the local oscillation circuit 209. FIG. 5 shows an example of the FSK modulation circuit 214. As shown in FIG. 5, this FSK modulation circuit 214 is constituted by resistors $R_1$ to $R_3$ and a capacitor $C_1$ and is designed to supply a DC displacement to the local oscillation circuit 209 to set a predetermined modulation degree.

The local oscillation circuit 209 generates an output signal having a frequency corresponding to the control voltage $V_T$ from the FSK modulation circuit 214, and supplies this output signal to the switch 215. FIG. 5 shows an example of the local oscillation circuit 209. This local oscillation circuit 209 is constituted by a variable capacitance diode D1, a quartz oscillator $X_{TL}$, a transistor $T_R$, and capacitors $C_2$ and $C_3$. The local oscillation circuit 209 is constituted by a voltage-controlled quartz oscillation circuit in this manner and is designed to change the oscillation frequency in accordance with a change in capacitance with a change in reverse voltage applied to the variable capacitance diode D1.

The switch 215 supplies the output signal from the local oscillation circuit 209 to the contact a or b in response to the output signal SW from the decoder 211. The contact a of the switch 215 is connected to the 90-degree phase shifter 208. In addition, the contact b of the switch 215 is connected to the contact a of the switch 217 and the RF amplifier 202, as described above.

The 90-degree phase shifter 208 shifts the phase of the output signal, supplied from the local oscillation circuit 209 through the switch 215, by +45° and −45° respectively, to generate output signals, and supplies the output signals to the mixer circuits 203a and 203b, respectively.

An operation of this portable radio unit will be described next. A receiving operation will be described first.

A reception wave frequency-modulated with a binary digital-signal constituted by a mark and a space is input through the antenna 201 and passes through the contact a of the switch 217 to be amplified by the RF amplifier 202. The amplified wave passes through the contact a of the switch 216 to be divided into two components. The two components are then input to the mixer circuits 203a and 203b, respectively. A signal having the local oscillation frequency is supplied from the local oscillation circuit 209 and passes through the contact a of the switch 215 to be input to the 90-degree phase shifter 208. The phase of the signal is then shifted by +45° and −45°. The resultant signals are then input to the mixer circuits 203a and 203b, respectively. With this circuit arrangement, the mixer circuits 203a and 203b frequency-convert two signals having a phase difference of 90° into baseband signals and outputs the signals. Since the line frequency and the local oscillation frequency coincide with each other, the baseband signals have beat frequencies.

Figure 8A:
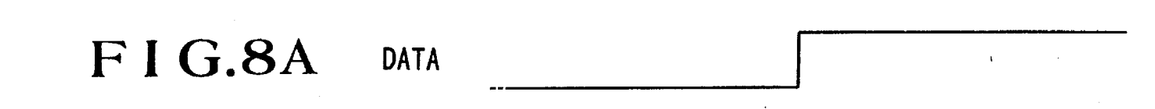
FIGS. 8A to 8D are timing charts showing an operation of the demodulation circuit.
Figure 8B:
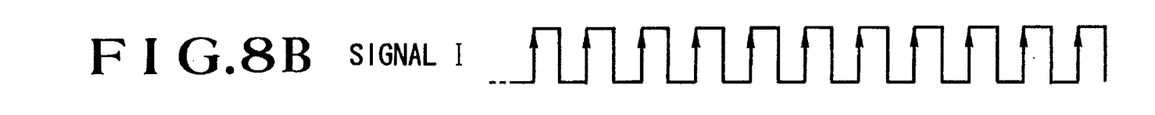
Figure 8C:
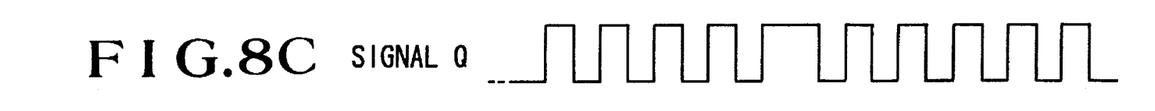
Figure 8D:
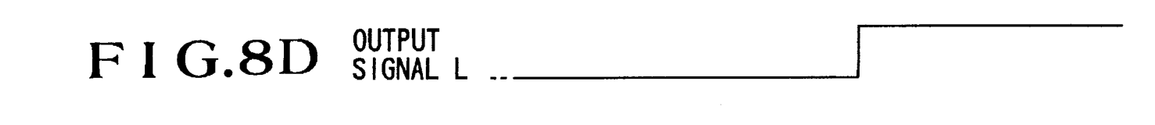

The low-pass filters 204a and 204b serve to extract only baseband signals and perform a band limiting operation on noise. The baseband signals from the low-pass filters 204a and 204b are respectively input to the limiter circuits 205a and 205b to obtain binary signals I and Q. The waveforms of signals in this case are shown in, e.g., FIGS. 8A to 8D. The data shown in FIG. 8A represents a modulated signal. When the signals I and Q shown in FIGS. 8B and 8C are input to the demodulation circuit 206, frequency detection is performed to supply an output signal L, as indicated by FIG. 8D.

Assume that the signals I and Q are respectively supplied to the clock input CL and data input D of the D-flip-flop constituting the demodulation circuit 206. In this case, if data is counted at the leading edge of a clock, an output signal L has a waveform shown in FIG. 8D. It is apparent that when the phases of the signals I and Q are changed by 90°, the output signal L changes in the same manner, and the data is demodulated. The demodulated signal demodulated in this manner is binarized by the waveshaping circuit 207 including a low-pass filter for removing noise to be output as a binary digital signal. This demodulated binary digital signal is compared with the selective calling number stored in the ROM 210 by the decoder 211. If they coincide with each other, it is determined that an incoming call is received. The decoder 211 then supplies an alarm signal to the alarm driver 212 to cause the speaker 13 to perform an informing operation.

Figure 9:
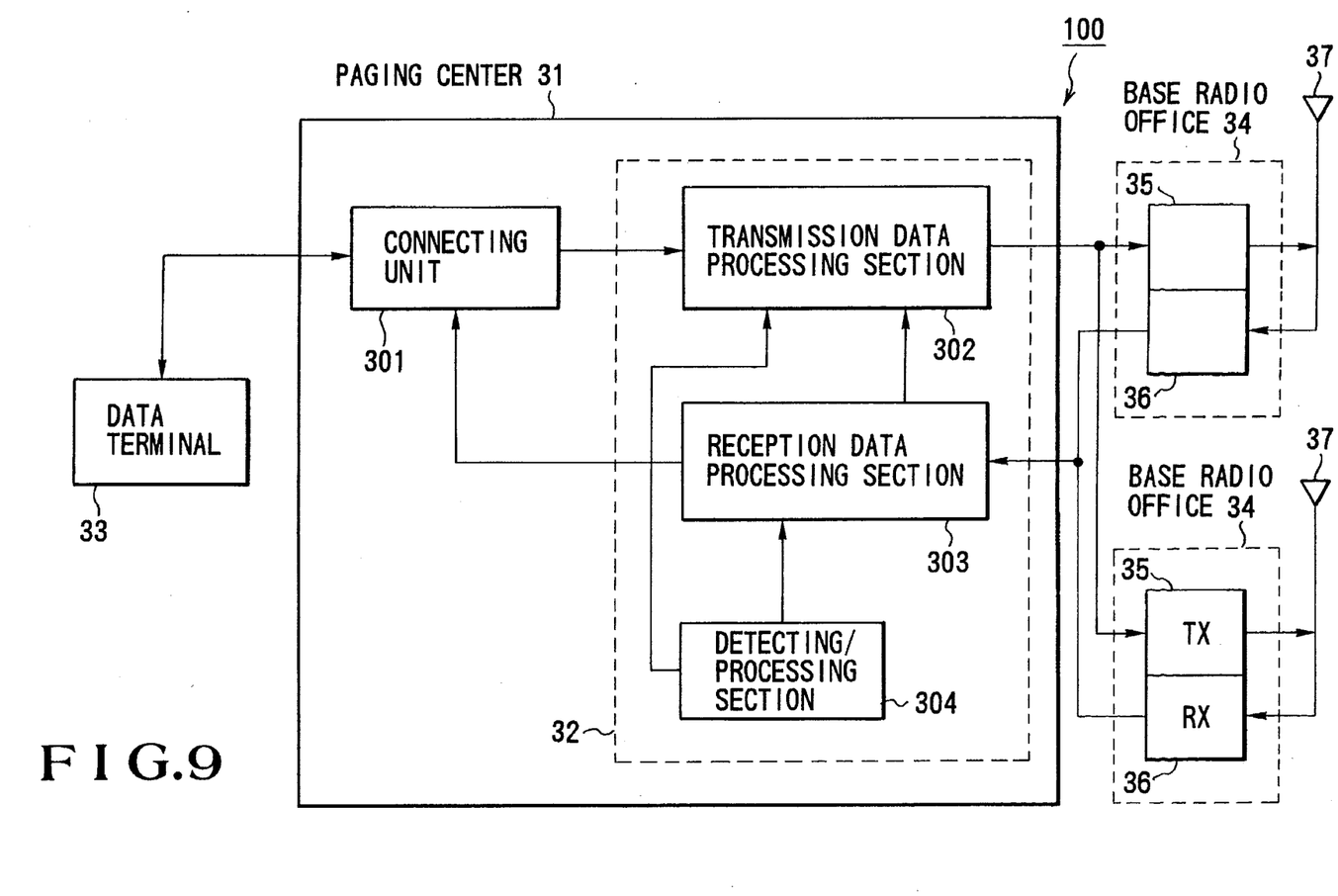
FIG. 9 is a block diagram showing a transmission office in the two-way paging system of the present invention.

FIG. 9 shows an arrangement of a transmission office in the two-way paging system according to the present invention. The transmission office denoted by reference numeral 100 as a whole comprises a paging center 31, a base radio office 34 having transmission and reception sections 35 and 36 connected to an antenna 37, and a data terminal 33 connected to the paging center 31. The paging center 31 includes a transferring/processing unit 32 for processing/ transferring a data signal, and a connecting unit 301. The transferring/processing unit 32 is constituted by a transmission data processing section 302 for processing a large number of input data signals from the data terminal 33 and supplying the resultant signals to the base radio office 34, a detection processing section 304 for detecting a reception data signal from the base radio office 34, and a reception data processing section 303 for processing/transferring the detected data from the detection processing section 304.

Referring to FIG. 9, the data terminal 33 is a stationary terminal including a keyboard, a display section, a printer, and the like. In this arrangement, transmission is performed as follows. An operator inputs a selective calling number of a callee and a message by using the keyboard. The input data calls the connecting unit 301 of the paging center 31. The connecting unit 301 supplies the input data to the transmission data processing section 302 of the transferring/processing unit 32 and is output from the base radio office 34.

When the reception of the incoming call is acknowledged, the receiver shown in FIG. 4 transmits an answer-back signal to the base radio office 34. Upon reception of the answer-back signal through the base radio office 34, the paging center 31 performs error correction of a reception code by using the detection processing section 304, and checks the calling number. If it is determined that the calling number is correct, the paging center 31 supplies an answer-back signal to the reception data processing section 303, and acknowledges the reception of the answer-back signal to the data terminal 33 through the connecting unit 301.

Signal formats will be described below.

Figure 2:
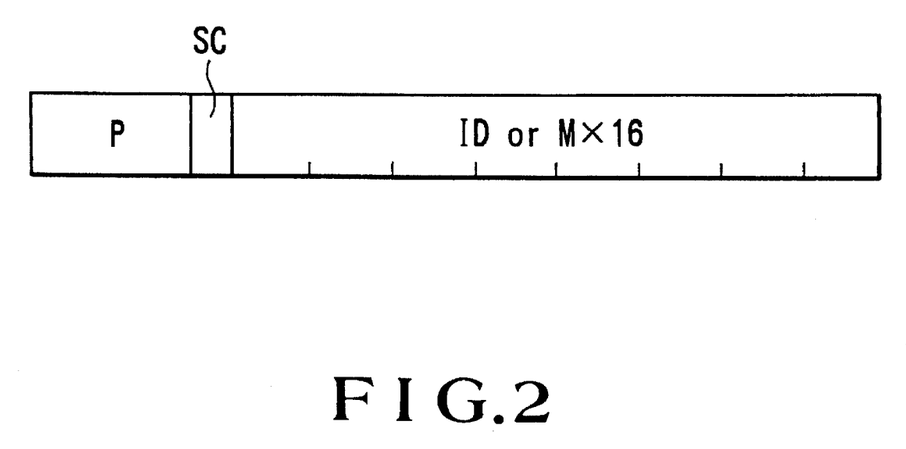
FIG. 2 is a view showing a signal format used in the two-way paging system of the embodiment.

FIG. 2 shows a transmission signal from the transmission office. Basically, the existing POCSAG (Post Office Code Standardization Advisory Group) system is used.

A preamble signal P for establishing bit synchronization, a sync signal SC for establishing frame synchronization, and a selective calling signal ID or a message signal M are sequentially transmitted in the order named.

One group is constituted by two code words. One word is constituted by a BCH (31, 21) code shown in FIG. 3.

Figure 3:
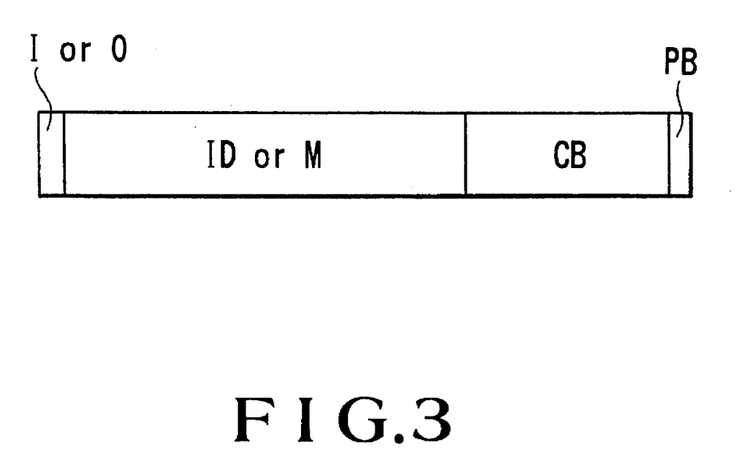
FIG. 3 is a view showing a signal format used in the two-way paging system of the embodiment.

More specifically, the first bit represents the contents of data such that "0" represents the selective calling number ID and "1" represents the message signal M. The second bit to the 21st are data representing the signal ID or M. The 22nd bit to the 31st bit are check bits CB. The 32nd bit is a parity bit PB.

Figure 1A:
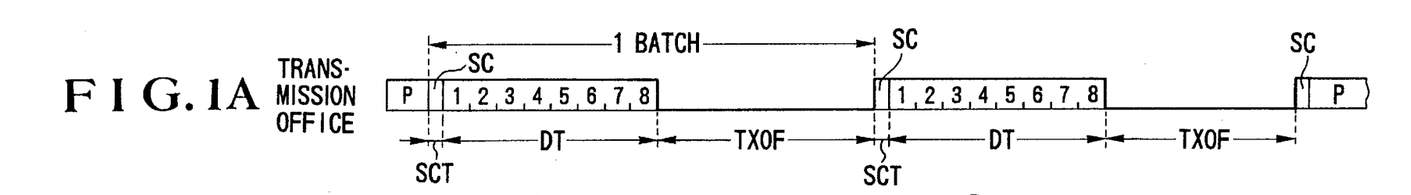
FIGS. 1A to 1D are timing charts showing a signal format used in a two-way paging system according to an embodiment of the present invention.
Figure 1B:
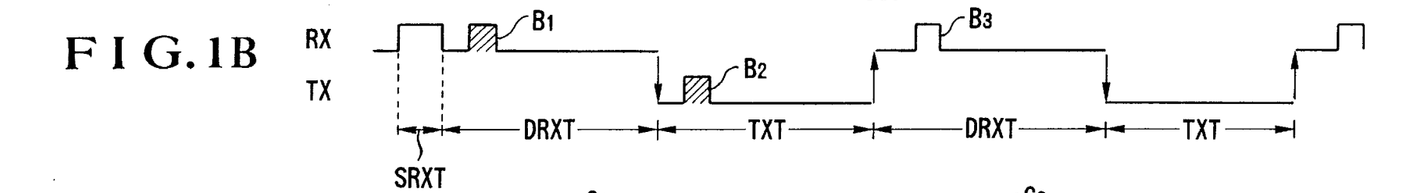
Figure 1C:
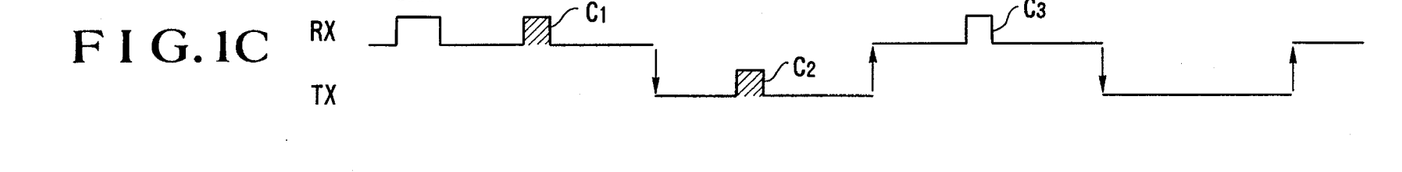
Figure 1D:
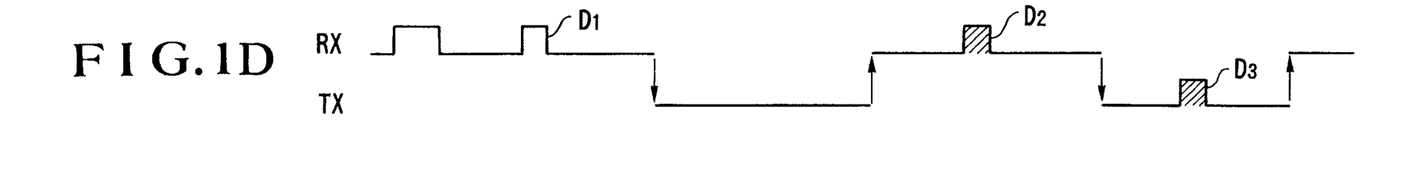

FIG. 1A shows the transmission timing of the transmission office. Figs. 1B to 1D show the transmission and reception timings of the portable radio unit. Referring to FIG. 1A, one batch of a transmission signal from the transmission office consists of a period SCT of the sync signal SC, a data transmission period DT corresponding to signals of eight groups, and a transmission stop period TXOF corresponding to eight groups. That is, one batch is constituted by 33 code words. Note that the selective calling signal ID is always set at the first code word to avoid repetition of an answer-back signal.

As shown in FIG. 1B, the transmission/reception format of the portable radio unit is constituted by a frame sync signal reception period SRXT during which a frame sync signal is received to establish frame synchronization, a data signal reception period, DRXT, during which a data signal is received to determine whether an ID code contained in the data signal coincides with the ID code of the portable radio unit, and an answer-back signal transmission period, TXT, during which an answer-back signal is transmitted at a timing assigned to the group of the portable radio unit when the ID code contained in the received data signal coincides with the ID code of the portable radio unit.

A transmitting/receiving operation will be described below. Upon establishing bit synchronization and frame synchronization using the preamble signal P and the sync signal SC from the transmission office, the portable radio unit stops reception RX until a reception timing assigned to the group of the unit comes. The portable radio unit performs a receiving operation again at a reception timing assigned to the group of the unit during the data transmission period DT constituted by a plurality of continuous groups 1 to 8 shown in FIG. 1A. If the ID code of the received signal coincides with the ID of the unit, the portable radio unit performs a paging informing operation, and also performs transmission TX of an answer-back signal at a timing assigned to the group of the unit during the transmission stop period TXOF, as described above. FIGS. 1B and 1C respectively show ID reception $B_1$ and ID reception $C_1$, answer-back processing $B_2$ and answer-back processing $C_2$, and erroneous ID reception $B_3$ and erroneous ID reception $C_3$, at timings assigned to the groups 2 and 4. FIG. 1D shows ID reception $D_2$ and answer-back processing $D_3$ at timings assigned to the group 4 of a portable radio unit after erroneous ID reception $D_1$ is performed.

As shown in FIGS. 1A to 1D, even if the transmission timings of portable radio units correspond to the same group, transmission is not performed simultaneously and no radio interference occurs as long as they have different ID codes.

When the decoder 211 shown in FIG. 4 acknowledges reception of an incoming call at the above-mentioned timing, it performs an answer-back operation to acknowledge the reception of the incoming call to the transmission office when the transmission office completes the transmission.

An answer-back signal AB transmitted from the decoder 211 is input to the FSK modulation circuit 214. As a result, a DC displacement for setting a predetermined modulation degree is supplied to the local oscillation circuit 209.

Figure 6:
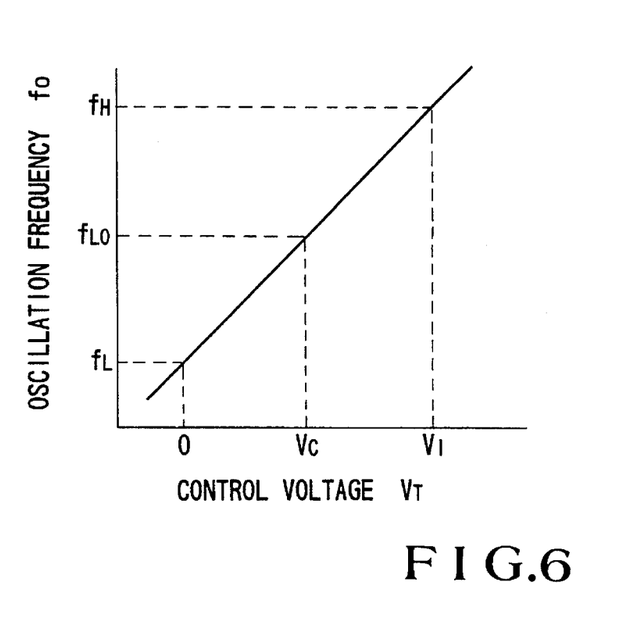
FIG. 6 is a graph showing an oscillation frequency characteristic with respect to the control voltage.

Assume that the output buffer of the decoder 211 is constituted by a three-state buffer. During a reception period, the output of the decoder 211 is set at a high impedance, and the control voltage $V_T$ of the voltage-controlled quartz oscillation circuit is biased to a central value $V_C$. During a transmission period, when a transmission signal is set at HIGH, the output of the decoder 211 is set at HIGH, and the control voltage $V_T$ is biased to a voltage $V_1$. When the transmission signal is set at LOW, the output of the decoder 211 is set at LOW, and the control voltage $V_T$ is set at 0 V. If the characteristic of an oscillation frequency $f_0$ with respect to the control voltage $V_T$ of the voltage-controlled quartz oscillation circuit is linear, as shown in FIG. 6, an output from the local oscillation circuit 209 is modulated with an output from the decoder 211.

In this case, the signal SW from the decoder 211 sets the switches 215, 216, and 217 to the contacts b. Upon this switching operation, the output signal from the local oscillation circuit 209 is amplified by the RF amplifier 202 and is input to the antenna 201 through the switches 216 and 217 to be transmitted to the transmission office. Note that the impedances of the RF amplifier 202 and the antenna 201 match because the reception frequency and transmission frequency are the same. Therefore, no impedance matching circuit is required during a transmission period.

Figure 10:
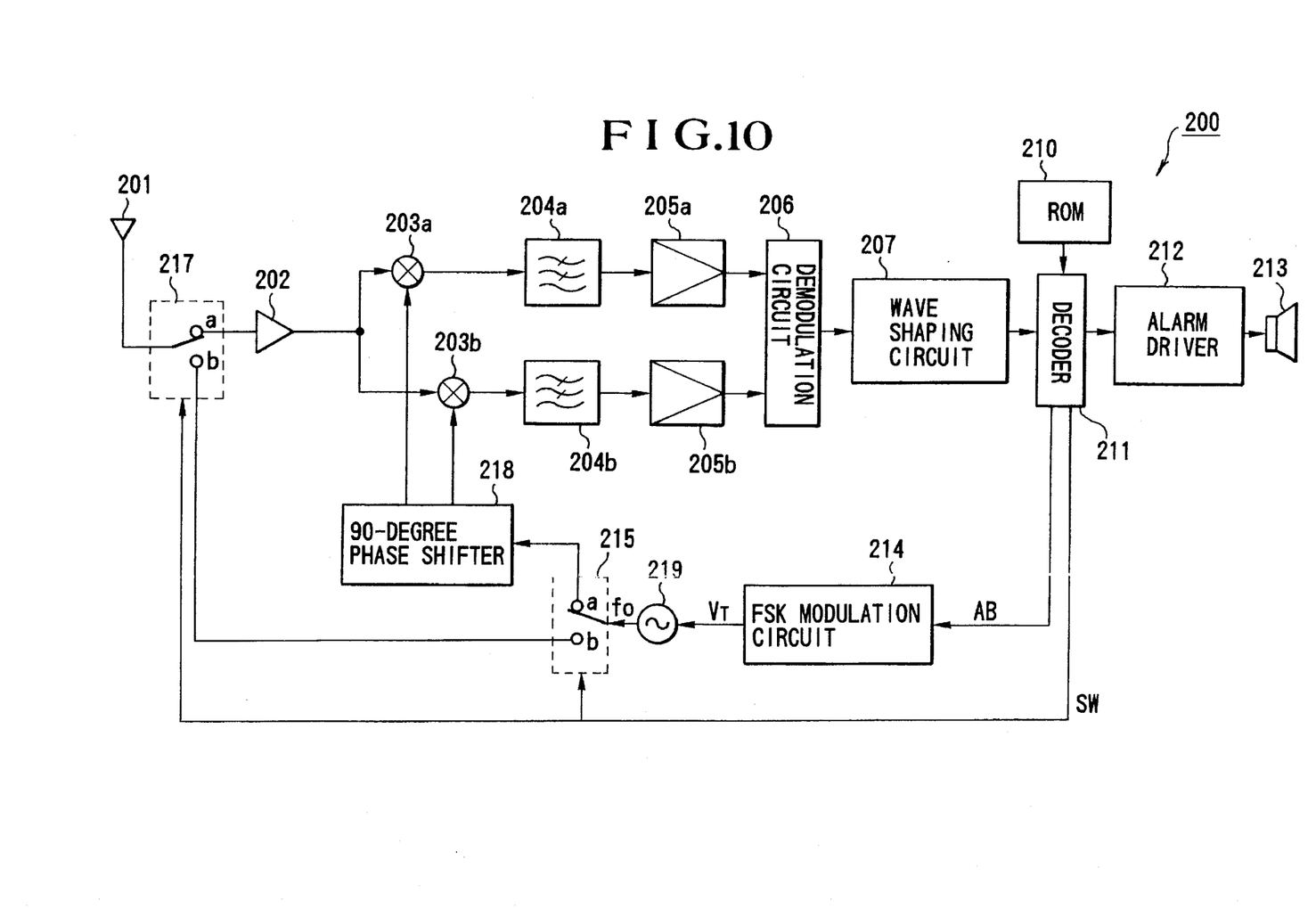
FIG. 10 is a block diagram showing another embodiment of the present invention.

FIG. 10 shows another embodiment of the present invention. This embodiment can be applied to a case wherein the system is used within a narrow range. Since this system requires only low output, the switch 216 used in the embodiment shown in FIG. 4 can be omitted to simplify the circuit. Other arrangements are the same as those of the embodiment in FIG. 4. In this embodiment, a basic operation is the same as that of the embodiment shown in FIG. 1.

As has been described above, according to the present invention, there is provided a two-way paging system which can be easily realized without requiring a great change in the existing POCSAG system.

According to the present invention, since the voltage-controlled oscillation section of the reception system for receiving a local oscillation signal is used as the reception circuit of the transmission system, a reduction in size and weight of the overall circuit can be achieved.

What is claimed is:

1. A two-way system comprising:
a radio transmission office for transmitting a call signal in accordance with a predetermined transmission format, and for receiving an answer-back signal transmitted in time-division transmission in accordance with a predetermined transmission format; and
a portable radio unit for receiving said call signal from said radio transmission office, and transmitting said answer-back signal in accordance with the predetermined transmission format when an ID code contained in the received call signal coincides with an ID code of said portable radio unit, and
wherein the transmission format of the call signal in said radio transmission office is constituted by a frame sync signal transmission period during which a frame sync signal is transmitted, a data signal transmission period during which a data signal containing said ID code is transmitted, and a transmission stop period which is equal to the data signal transmission period in duration and during which transmission of data is stopped, said frame sync signal transmission period, said data signal transmission period and said transmission stop period occurring, respectively, in sequence, and
the transmission format of the answer-back signal in said portable radio unit is constituted by a frame sync signal reception period during which the frame sync signal transmitted during the frame sync signal transmission period is received and during which frame synchronization is established, a data signal reception period during which the data signal transmitted during the data signal transmission period is received, and an answer-back signal transmission period which is equal to the data signal reception period in duration, and during which the answer-back signal is transmitted in correspondence with the transmission stop period when the ID code contained in the data signal coincides with the ID code of said portable radio unit, said frame sync signal reception period, said data signal reception period and said answer-back signal transmission period occurring respectively, in sequence;

and wherein the data signal transmission period is constituted by a plurality of continuous calling side group transmission periods to which a plurality of data signals are respectively assigned to be transmitted, and the answer-back signal transmission period is constituted by a plurality of continuous answering side group transmission periods during which an answer-back signal is transmitted in a timing of a group transmission period assigned in correspondence with the transmission period of the data signal;

and wherein same frequency band is used for receiving said call signal and transmitting said answer-back signal, and wherein the data signal transmission period and the transmission stop period are equal to the data signal reception period and the answer-back signal transmission period, respectively, and wherein the frame sync signal transmission period, the data signal transmission period and the transmission stop period constitute one batch, and the answer-back signal is transmitted in a half batch after the ID code is received.

2. A system according to claim 1, wherein the data signal transmitted during the plurality of continuous calling side group transmission periods is constituted by two code words per group, and the ID code is provided at the first code word.

3. A system according to claim 1, wherein during the data signal reception period, it is determined whether the ID code contained in the received data signal coincides with the ID code of said portable radio unit.

4. A system according to claim 1, wherein said portable radio unit comprises:
a voltage-controlled oscillation means for generating a local oscillation signal having a frequency corresponding to a control voltage;
a demodulating means for obtaining a demodulated signal on the basis of a received radio signal and the local oscillation signal from said voltage-controlled oscillation means by an orthogonal detection/reception scheme to output the ID code contained in the received call signal;
a detecting means for detecting whether the ID code from said demodulating means coincides with the ID code of said portable radio unit to generate an answer-back signal for acknowledging reception of an incoming call; and
a modulating means for changing the control voltage to be applied to said voltage-controlled oscillation means on the basis of the answer-back signal from said detecting means to modulate the local oscillation signal of said voltage-controlled oscillation means as the answer-back signal.

\* \* \* \* \*